United States Patent [19]

Siglow et al.

[11] 4,276,642
[45] Jun. 30, 1981

[54] PROCESS FOR THE FRAME SYNCHRONIZATION OF A TIME DIVISION MULTIPLEX SYSTEM

[75] Inventors: Joachim Siglow, Wolfratshausen, Fed. Rep. of Germany; Sigmar Grützmann, Zug, Switzerland; Erwin Schenk, Munich, Fed. Rep. of Germany

[73] Assignee: Siemens Aktiengesellschaft, Berlin & Munich, Fed. Rep. of Germany

[21] Appl. No.: 17,921

[22] Filed: Mar. 6, 1979

[30] Foreign Application Priority Data

Mar. 17, 1978 [DE] Fed. Rep. of Germany ....... 2811851

[51] Int. Cl.³ .............................................. H04J 3/06
[52] U.S. Cl. .................................... 370/100; 370/105; 370/106
[58] Field of Search .................... 179/15 BS; 370/100, 370/106, 105

[56] References Cited

U.S. PATENT DOCUMENTS

| | | | |
|---|---|---|---|
| 3,576,947 | 5/1971 | Kruger | 179/15 BS |
| 3,603,735 | 9/1971 | Cleobury | 179/15 BS |
| 3,689,699 | 9/1972 | Brenig | 179/15 BS |
| 4,016,368 | 4/1977 | Apple | 179/15 BS |
| 4,142,070 | 2/1979 | Landaver | 179/15 BS |
| 4,154,984 | 5/1979 | Murasov | 179/15 BS |

*Primary Examiner*—David L. Stewart
*Attorney, Agent, or Firm*—Hill, Van Santen, Steadman, Chiara & Simpson

[57] ABSTRACT

A process is disclosed for frame synchronization in a time division multiplex system which, while ensuring a high degree of synchronization reliability, requires only a small transmission capacity. In accordance with the invention, before a synchronous state is reached, a synchronization alarm (SA=1) is given and the recognition of two consecutive synchronizing words (100010) defines the beginning of a test period (P). If synchronizing words (100010) are constantly received during this test period (P), the synchronization alarm (SA=1) is disconnected. If only one single synchronizing word (100010) is not recognized during the test period (P), the synchronization alarm continues. Commencing from the synchronous state, the synchronization alarm is given if a plurality of synchronizing words are not recognized (FIGS. 3 to 6).

2 Claims, 7 Drawing Figures

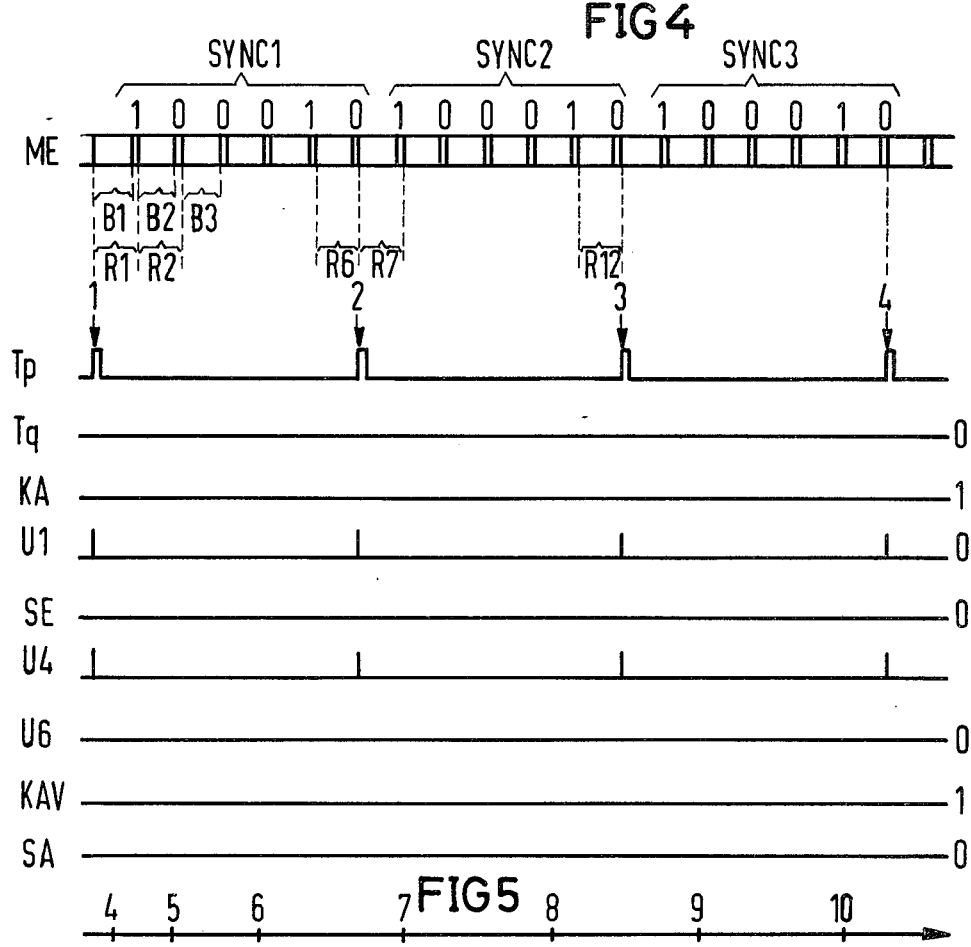
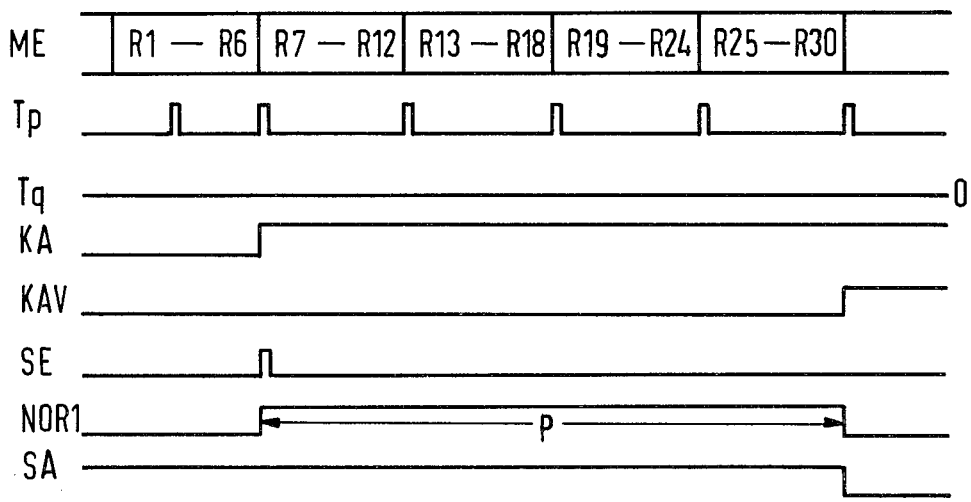

PROCESS FOR THE FRAME SYNCHRONIZATION OF A TIME DIVISION MULTIPLEX SYSTEM

BACKGROUND OF THE INVENTION

The invention relates to a process for the frame synchronization of a time division multiplex (t.d.m.) system comprising a multiplexer which makes available m time slots with respect to each t.d.m. frame and emits a t.d.m. signal.

For the frame synchronization of t.d.m. systems, it is known to transmit a plurality of sychronizing bits which together form a synchronizing word with respect to each t.d.m. frame. By means of the decoding of this synchronizing word at the receiving end, the position of the t.d.m. frame is recognized and t.d.m. frame synchronization is facilitated. If the synchronizing words are formed only from a relatively small number of synchronizing bits, the probability that synchronizing features will be simulated by data words is relatively high, so that systems of this kind are frequently subject to disturbance. If, in contrast, the synchronizing words are formed from many individual synchronizing bits, simulation of synchronizing features by data bits is only slight, although a relatively large proportion of the channel transmission capacity is required to transmit the synchronizing information.

SUMMARY OF THE INVENTION

An object of the invention is to provide a process for frame synchronization which, in spite of insensitivity to simulation of synchronizing features, requires only a relatively small channel transmission capacity.

The object on which tthe invention is based is realized by the use of the following steps:

(A) With respect to each t.d.m. frame, the t.d.m. signal contains $m-1$ data bits and one synchronizing bit.

(B) At least $p \geqq 6$ consecutive synchronizing bits form a synchronizing word.

(C) A synchronizing alarm is given before a synchronous state is reached, and the occurrence of two consecutive synchronizing words defines the beginning of a test period, the duration of which amounts to at least one multiple of (p) t.d.m. frames.

(D) If synchronizing words are received continuously during the test period, the synchronizing alarm is disconnected.

(E) If one single synchronizing word is not recognized during the test period, the synchronizing alarm continues.

(F) Commencing from the synchronous state, the synchronizing alarm is given if a plurality of synchronizing words are not recognized.

The process in accordance with the invention is characterized by substantial insensitivity to simulation of synchronizing features, since a plurality of consecutive synchronizing words are used for synchronization purposes and the individual synchronizing words consist of a relatively large number of individual synchronizing bits. In spite of this relatively extensive synchronizing information, only a small channel transmission capacity is required to transmit the synchronizing information since only one single synchronizing bit is transmitted in each t.d.m. frame.

If, in addition to the synchronizing word which occurs in a given time slot of the t.d.m. signal, a further synchronizing word is transmitted which is identical to the synchronizing word but occurs in a different time slot, it is expedient to employ the following steps:

(G) The recognition of two consecutive synchronizing words or two consecutive further synchronizing words defines the beginning of the test period.

(H) During the test period it is constantly checked as to whether synchronizing words or further synchronizing words are received in two different time slots and if this is so the synchronizing alarm continues.

(I) Following a given duration of the synchronizing alarm, binary signals having given binary values are transmitted in place of the data bits from transmitting-end data sources.

(K) When frame synchronization has been achieved, the transmission of the data bits from the transmitting-end data sources is resumed.

In order to set up the addresses for the operation of a demultiplexer, it is expedient to provide that following the recognition of two consecutive synchronizing words at the receiving end a synchronization recognition signal is emitted, which results in the resetting of the count of a first counter which, from a starting count, counts m.p further counts and emits a synchronizing signal with the aid of which the addresses of a receiving-end address generator are set up in order to operate a receiving-side demultiplexer.

In order to safely maintain the synchronous state in spite of any disturbed synchronizing words, it is expedient to feed the synchronizing signal to a second counter whose count is reset when there is coincidence between the synchronizing signal and the synchronization recognition signal and which emits a counting signal when a given count is reached.

In order to safely prevent the simulation of a synchronous state by randomly occurring synchronizing words, it is expedient, following the occurrence of the counting signal and the synchronization recognition signal to set up a first and second state respectively in a bistable trigger stage, in accordance with the instantaneous nonsynchronous or synchronous state of the frame synchronization, and to emit a first and second trigger stage signal respectively.

BRIEF DESCRIPTION OF THE DRAWINGS

FIG. 4 illustrates a few signals which occur during the operation of the synchronization discriminator illustrated in FIG. 2, in the synchronous state;

FIG. 5 illustrates a few signals which occur during the operation of the synchronization discriminator illustrated in FIG. 3 during the course of the attempts to achieve frame synchronization;

DESCRIPTION OF THE PREFERRED EMBODIMENTS

Figure 1:
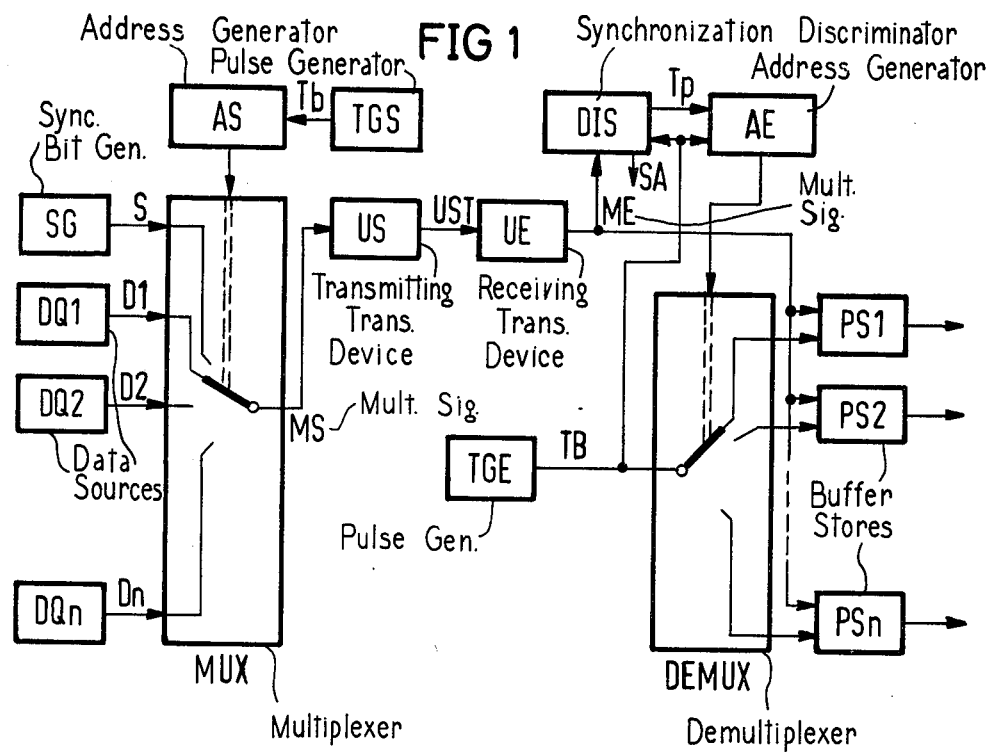
FIG. 1 illustrates a t.d.m. system.

FIG. 1 illustrates the synchronizing bits generator SG and the data sources DQ1, DQ2...DQn, whose outputs are connected via assigned data channels to inputs of the multiplexer MUX. Thus the signal S from the synchronizing bit generator is emitted via a first data channel and the data signals D1, D2 . . . Dn are emitted via further data channels to the multiplexer MUX. The signals S and D1, D2 . . . Dn consist of sequences of individual bits from which, with the aid of the multiplexer MUX, the transmitting-end multiplex signal MS is formed which, with respect to each t.d.m. frame, is composed of at least one part of all the signals S, D1, D2 . . . Dn. If the signals S, D1, D2 . . . Dn are emitted at the same bit rate, with respect to each t.d.m. frame the t.d.m. signal MS contains one part of all the signals. However, it is also possible to emit the data signals D1, D2 . . . Dn with a different bit rate in which case with respect to each t.d.m. frame, the t.d.m. signal MS contains several parts of the individual data signals D1, D2 . . . Dn. The multiplexer MUX is operated with the aid of the transmitting-end address generator AS, although details regarding the transfer of the individual signals S, D1, D2 . . . Dn with respect to the pulsing will not be discussed since they can be assumed to be known already and are outside the scope of the present invention. For example, generally, buffer stores are required in order to process the signals S, D1, D2 . . . Dn at the correct time in the multiplexer MUX. It will be assumed that buffer stores of this kind —if required —are arranged inside the multiplexer MUX.

Figure 2:
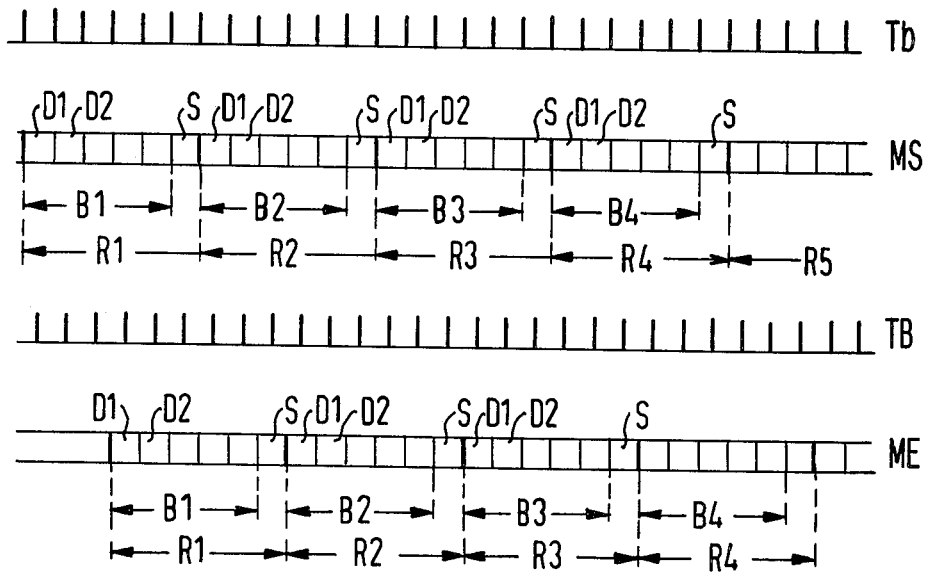
FIG. 2 illustrates a few signals which occur during the operation of the t.d.m. system represented in FIG. 1.

FIG. 2 illustrates the acquisition of the multiplex signal MS, wherein, for example, a total of six channels has been assumed although in practice a considerably larger number of channels will normally be provided. The bit pulse train Tb is produced by the pulse generator TGS illustrated in FIG. 1. In addition to the individual bits of the data signals D1, D2 . . ., each t.d.m. frame R1, R2, R3, R4, R5 of the t.d.m. signal MS contains one synchronizing bit S. The bits B1, B2, B3, B4 of the individual data signals D1, D2 . . . are always followed by one synchronizing bit S.

One method of inserting these synchronizing bits S between the individual bits B1, B2, B3, B4 of the data signals is illustrated in FIG. 1, in which the synchronizing bit generator SG is connected as data source. However, it would also be fundamentally conceivable merely to provide the data source DQ1 to DQn at the transmitting side in accordance with FIG. 1 and to insert the synchronizing bits S subsequently to the multiplexer MUX in the transmission path.

The multiplex signal MS is transmitted across the transmission link UST with the aid of the transmitting-end transmission device US illustrated in FIG. 1 and is received with the aid of the receiving-end transmission device UE. The receiving-end pulse generator TGE produces the bit pulse train TB which is also shown in FIG. 2 The receiving-end multiplex signal ME is fundamentally identical to the transmitting-end t.d.m. signal MS but occurrs with a time delay relative to the latter.

The synchronization discriminator DIS illustrated in FIG. 1 is fed with the t.d.m. signal ME, and the sychronizing signal Tp is obtained which serves to control the receiving-end address generator AE. The t.d.m. signal ME is fed to the buffer stores PS1, PS2 . . . PSn which are activated with the aid of the demultiplexer DEMUX and the bit pulse train TB. The fundamental purpose of the frame synchronization is to achieve frame synchronism between the transmitting-end multiplexer MUX and the receiving-end demultiplexer DEMUX which is achieved by always resetting the address generator AE in such a way that the data signals D1, D2 . . . Dn are intermediately stored in turn in the buffer stores PS1, PS2 . . . PSn. Data terminal devices (not shown in FIG. 1) are connected to the outputs of these buffer stores.

Figure 3:
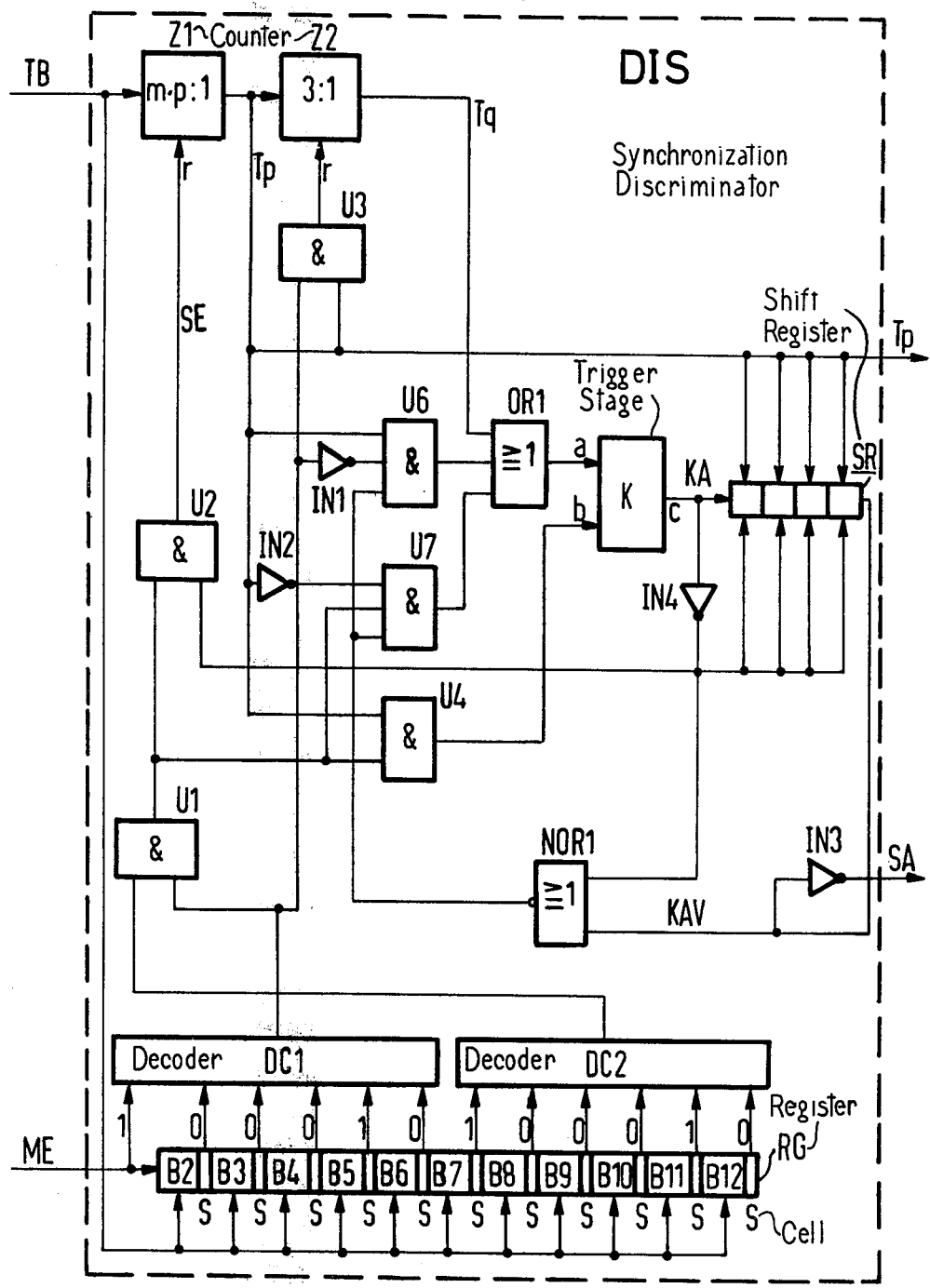
FIG. 3 is a more detailed view of a synchronization discriminator schematically illustrated in FIG. 1.

FIG. 3 is a more detailed view of the synchronization discriminator DIS which is schematically illustrated in FIG. 1 FIGS. 4 to 7 show signals which occur during the operation of this synchronization discriminator. The receiving-end multiplex signal ME is fed in serial fashion to the register RG which is operated as a shift register, and the pulses of the bit pulse train TB are used as a shift pulse train. The register RG contains the blocks B2, B3, B4, B5, B6, B7, B8, B9, B10, B11, B12 which are designated by the same references as the bits shown in FIG. 2 since these blocks serve to store these bits. The blocks B2 to B12 are each followed by a cell S which serves to store the synchronizing bits which have been provided with the same references in FIG. 2. In this exemplary embodiment the individual blocks B2 to B12 each consist of six cells, whereas in practice these blocks B2 to B12 each consist of 46 cells each of which is followed by a cell S. Thus in practice a total of 47 bits are transmitted within the t.d.m. frame.

The decoders DC1 and DC2 both respond to the synchronizing word 100010 and on the recognition of these synchronizing words each emit 1-signals. Only the blocks B2 to B6 and the corresponding cells S are required in order to recognize the first synchronizing word with the aid of the decoder DC1 since the t.d.m. signal ME is fed directly to the first input of the decoder DC1.

The bit pulse train TB is fed to the counter Z1 which, following a total of p.m pulses, emits an output pulse Tp. It has been assumed that the t.d.m. signal comprises a total of m time slots. In accordance with FIG. 2 it has been assumed that m=6, and in practice a t.d.m. frame where m=47 contains a total of 47 time slots. The signal Tp which is emitted via the output of the counter Z1 is shown in FIG. 4. The bits B1, B2, B3 . . . of the multiplex signal ME are again followed by the synchronizing bits, so that the synchronizing word SYNC1=100010 is received from the time 1 until the time 2. The synchronizing words SYNC2 and SYNC3 consist of the same synchronizing bits and are received at later times. Thus the synchronizing word SYNC1 is transmitted during the t.d.m. frames R1 to R6, and the synchronizing word SYNC2 is transmitted during the t.d.m. frames R7 to R12. Similarly, the synchronizing word SYNC3 is transmitted during six t.d.m. frames. All the synchronizing words consist of p=6 synchronizing bits S.

The counter Z2 is known as a synchronizing word counter since it contains the synchronizing signal Tp at its input and counts the pulses thereof. If it is not reset in advance, it counts up to 3 and then emits the signal Tq via its output. Each of the counters Z1, Z2 possesses a resetting input r and is reset to a starting count when a 1-signal is received. The trigger stage K is able to assume two stable states and during a 0- or 1-state emits a 0- or 1-signal respectively from its output c. A transition frame the 0- to the 1-state occurs whenever a 1-signal occurs at the input b. A transition from the 1-state into the 0-state occurs whenever a 1-signal occurs at the input a. The signal KA is emitted via the output c of the trigger stage K.

The mode of operation of the synchronization disciminator DIS illustrated in FIG. 3 will now be described making reference to the signals illustrated in FIG. 4 in the event that the synchronization state has already been reached. Synchronization, at least of short duration, is signalled by the signal KA=1. The decoders DC1 and DC2 constantly recognize the received synchronizing words and each emit 1-signals to the AND-gate U1 for which reason this gate also emits 1-signals, provided with the same reference U1 in FIG. 4, at the times 1, 2, 3, 4. However, these 1-signals U1 are not active at the output of the AND-gate U2 since a 0-signal is present at an input of the AND-gate U2 on account of the inverter IN4, so that the signal SE=0 is emitted via the output of the AND-gate U2. Consequently for the duration of the signal SE=0 the counter Z1 is not reset and therefore the counting mode of this counter remains unchanged and, as illustrated in FIG. 4, the synchronizing signal Tp is emitted. As the output signals of the decoder DC1 coincide with the individual pulses of the synchronizing signal Tp under the imposed conditions, 1-signals are constantly emitted from the output of the AND-gate U3 approximately at the times 1, 2, 3, 4 and reset the counts of the counter Z2 so that the signal Tq=0 is emitted.

The signal Tq is constantly a 0-signal because the counter Z2 is constantly reset. 0-signals are constantly emitted from the outputs of the gates U6 and U7 since the gate NOR1 supplies a 0-signal under the assumed conditions. Thus three 0-signals are connected to the gate OR1 so that a 0-signal is also present at its output and at the input a of the trigger stage K, and the signal KA=1 remains unchanged. If we assume that this state continues for more than three periods of the signal Tp, the signal KAV=1 occurs at the output of the shift register SR and the signal SA=0, which signifies "no synchronization alarm" is emitted via the output of the inverter IN3.

FIG. 5 illustrates several sections of the t.d.m. signal ME during each of which a synchronizing word is transmitted. These are the t.d.m. frames R1 to R6 and R7 to R12 and R13 to R18 and R19 to R24 and R25 to R30. From the time 4 until the time 6 a non-synchronous state prevails. This can be seen for exampl from the occurrence of the pulse Tp at the time 5. The signal KA=0 also signals the non-synchronous state up to the time 6. For the duration of this non-synchronous state the shift register SR stores the signal ka=0 in the individual cells and causes them to be advanced from one cell to the next in the timing of the pulses Tp. For the duration of this non-synchronous state, the signal KAV=0 is emitted via the output of the shift register SR and the signal SA=1 which signals a synchronization alarm is emitted via the inverter IN3.

Prior to the time 6, a 1-signal is emitted via the output of the inverter IN4 to an input of the AND-gate U2 thus establishing readiness for the initiation of synchronization. It will be assumed that at the time 6 the two decoders DC1 and DC2 recognize the synchronization word so that a 1-signal is emitted via the AND-gate U1 and the synchronization recognition signal SE=1 is emitted via the output of the AND-gate U2. The counter Z1 is reset with this synchronization recognition signal Se so that from the time 6 onwards it commences its counting cycle and at the time 7 emits a pulse of the signal Tp at the end of the t.d.m. frame R12. Also thereafter, at the times 8, 9 and 10, pulses of the signal Tp are emitted. Thus from the time 6 onwards the pulses of the signal Tp possess the correct phase state relative to the t.d.m. frames of the multiplex signal ME.

At the time 6 the pulse of the signal Tp and the output pulse of the AND-gate U1 is fed to the AND-gate U4 so that a 1-signal is fed via its output to the input b of the trigger stage K. In this way, from the time 6 onwards the trigger stage K is set to its second stable state and emits the signal KA=1.

Even before the time 6, the contents of the cells of the shift register SR have been erased since a 1-signal has been emitted via the output of the inverter IN4. From the time 6 onwards, the signal KA=1 is transferred into the shift register SR and at the time 10 the signal KAV=1, which has been delayed by four periods of the signal Tp, is emitted via the output of the last cell of the shift register SR. In this respect, the synchronization alarm is given with the signal SA=1 until the time 10, whereupon the synchronization alarm is cancelled with the signal SA=0.

The gate NOR1 emits a 1-signal via its output only when 0-signals are present at both inputs. Thus from the time 6 until the time 10 this gate NOR1 defines a test period P which is equal to four periods of the signal Tp and within which it is checked whether the decoder DC1 still recognizes the received synchronizing words 100010. If, for example, the decoder DC1 did not recognize the synchronizing word at the time 7, the inverter IN1 would emit a 1-signal and with the signals Tp=1 and NOR1=1, a 1-signal would be emitted to the input a of the trigger stage K via the output of the gate U6 and via the gate OR1. Consequently the trigger stage K would also be brought into its first state during which it emits the signal KA=0. With the signal KA=0 and the corresponding 1-signal at the output of the inverter IN4, the store contents of the cells of the shift register SR would be erased so that the synchronization alarm could not be cancelled at the time 10 but possibly not until a later time. Simultaneously, with the 1-signal at the output of the inverter IN4, the state of readiness for sychronization would be initiated. Even if no synchronizing words are recognized at the times 8 or 9, the non-synchronous state is signalled immediately thereafter with the aid of the signal KA=0 and the cancellation of the synchronization alarm is postponed.

In the event of disturbances, no synchronizing words which can be contained in a random text in the signal SE should be signalled at the receiving end. If the two decoders DC1 and DC2 recognize two synchronizing words each comprising six bits consecutively, for the calculation of the probability of the occurrence of random synchronizing words, a total of twelve bits and thus $2^{12}$ different bit combinations are possible. Under the assumption that these bit combinations are all equally probable, the probability of the random occurrence of the two consecutive synchronizing words is $\frac{1}{2}^{12}$. Using the shift register SR, this probability is substantially reduced inasmuch as now four consecutive synchronizing words are comprising six bits must be taken into account. Under this assumption, there are $2^{36}$ possible bit combinations so that now the probability of a random occurrence of four consecutive synchronizing words amounts to $\frac{1}{2}^{36}$. The larger the number of individual cells in the shift register SR, and thus the longer the test period P, the more improbable is it that erroneously and randomly occurring bit combinations will simulate synchronizing words.

Figure 6:
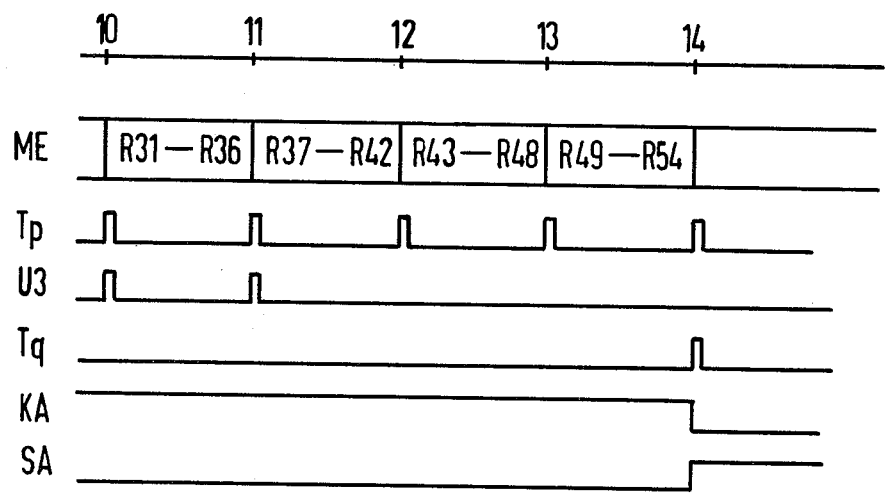
FIG. 6 illustrates a few signals which occur during the operation of the synchronization discriminator illustrated in FIG. 3 during the course of the synchronization monitoring.

FIG. 6 illustrates the monitoring of the synchronization and possibly the transition from the synchronous state into the non-synchronous state. A few sections of the t.d.m. signal ME relating to the t.d.m. frames R31 to R36, R37 to R42, R43 to R48, and R49 to R54 have again been shown. It will be assumed that at the time 11 the last pulse has been emitted via the output of the gate U3 and that thus the counter Z2 has been reset. Thus at the times 12, 13 and 14 no further resettings are effected since the decoder DC1 does not recognize any synchronizing words 100010. However, at the times 12, 13 and 14 pulses Tp are emitted and fed to the counter Z2 as counting pulses. As a result of this counting process, at the time 14 a pulse of the signal Tq is produced, which reaches the trigger stage K via the gate OR1 and via the input a and triggers the signal KA=0. Subsequently, shortly after the time 14, the synchronization alarm is given with the signal SA=1.

Thus before the synchronous state is reached, a synchronization alarm is given with the aid of the signal SA=1, and the occurrence of two consecutive synchronizing words 100010 defines the beginning of a test period P, the duration of which amounts to at least one multiple of (p) t.d.m. frames R1, R2 . . . If synchronizing words 100010 are received continuously during the test period P, the synchronization alarm is disconnected and the signal SA=0 is emitted via the output of the inverter IN3 illustrated in FIG. 3. If one single synchronizing word 100010 is not recognized during the test period P, the synchronization alarm continues and the signal SA=1 is emitted via the output of the inverter IN3. Commencing from the synchronous state, a synchronization alarm is given with the aid of the signal SA=1 whenever a plurality of synchronizing words 100010 are not recognized.

The shift register RG illustrated in FIG. 2, comprising as it does a plurality of cells, can be economically constructed using an addressable store. Under these conditions the individual cells of the store are addressed in such manner that the individual bits of the multiplex signal ME are stored in turn, and at the same time those storage cells in which the synchronizing bits can be stored are continuously interrogated.

Normally the synchronizing bits, shown in FIG. 4, of the synchronizing words 100010 appear in a given, uniform time slot of the multiplex signal ME. This is achieved for example in that, in accordance with FIG. 1, the synchronizing generator SG is connected as one of the data sources and the synchronizing bits S are fed to the multiplexer MUX via one of the channels. It would be fundamentally conceivable for one of the data sources DQ1 to DQn illustrated in FIG. 1 to likewise transmit synchronizing bits in which case two synchronizing words would be transmitted with the multiplex signal ME. For example, the synchronizing bits of the one synchronizing word can occur in the first time slot of each t.d.m. frame, and the synchronizing bits of the second synchronizing word can occur in the seventh time slot of each t.d.m. frame.

Figure 7:
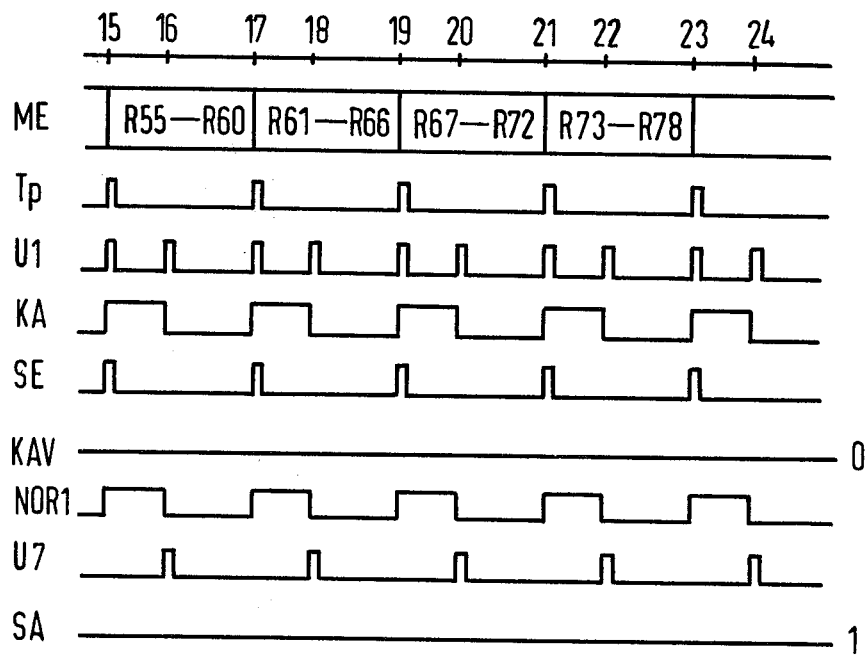
FIG. 7 illustrates a few signals which occur during the operation of the synchronization discriminator illustrated in FIG. 3 when synchronizing words are transmitted simultaneously over a plurality of channels.

In FIG. 7 it has been assumed that two synchronizing words occur in two different time slots and two different channels. Again several sections of the t.d.m. signal ME have been shown, relating to the t.d.m. frames R55 to R60, R61 to R66, R67 to R72, and R73 to R78. At the time 15, with the aid of the decoders DC1 and DC2 illustrated in FIG. 3, one of the two synchronizing words is recognized in one of the time slots and channels and is signalled on the one hand with the output signal of the AND-gate U1 and on the other hand with the synchronization recognition signal SE. In this way —similarly to the time 6 in FIG. 5—a possible synchronization is indicated with the trigger stage signal KA=1. In accordance with this possible synchronization the synchronizing pulses Tp are produced. However, the synchronization discriminator DIS illustrated in FIG. 3 is unable to decide whether the synchronizing words assigned to the time 15 emanate from the synchronization generator SG illustrated in FIG. 1 or from some other data source.

At the time 16, with the aid of the decoders DC1, DC2 and with the aid of the AND-gate U1, a further synchronizing word is reported which is obviously occurring in a different time slot and therefore is assigned to a different channel. At the time 16 a 1-signal is emitted via the output of the inverter IN2 because no synchronizing pulse Tp occurs at this time. At the time 15 the gate NOR1 has signalled the beginning of a test period and at the time 16 likewise emits a 1-signal to the AND-gate U7. With the output signal of the gate U1, at the time 16 three 1-signals are connected to the gate U7 so that a 1-signal is emitted via the latter's output and via the gate OR1 to the input a of the trigger stage K. As a result the trigger stage K is reset to its first state and emits the signal KA=0 which indicates lack of synchronization. Due to the signal KA=0, a 1-signal is emitted via the inverter IN4 to the gate NOR1 as a result of which the test period is terminated already at the time 16. Simultaneously all the contents of the storage cells of the shift register SR are erased so that the synchronization alarm continues to be given with the signal SA=1. At the times 17, 18 and 18, 20 and 21, 22 and 23, 24 the processes which have taken place at the times 15 and 16 are repeated. Consequently the synchronization alarm continues to be given with the signal SA=1.

If the synchronization alarm which is illustrated in FIG. 7 stays for a given length of times, this is an indication that synchronizing bits are being input not only via the synchronization generator SG illustrated in FIG. 1 but also via at least one other channel, for example with the aid of one of the data sources DQ1 to DQn and these synchronizing bits together form synchronizing words. In order nevertheless to achieve synchronization, binary signals having given binary values are input in place of the signals D1 to Dn emitted from the data sources DQ1 to DQn illustrated in FIG. 1. These can be binary signals corresponding to 0-values or 1-values, and continuous signals can be emitted, the polarity of which is referred to either as continuous start polarity or continuous stop polarity. Thus signals are input which do not simulate synchronizing words in any of the channels assigned to the data sources DQ1 to DQn. These binary signals can be input for example in that the channels across which the signals D1 to Dn illustrated in FIG. 1 are transmitted are interrupted with the aid of switches which are not shown in FIG. 1. It would also be conceivable to connect these channels in low-ohmic fashion to signal sources which constantly emit the desired binary values.

By disconnecting the individual channels of the data sources it is ensured that the synchronizing discriminator illustrated in FIG. 3 recognizes those synchronizing words whose synchronizing bits are assigned to one single channel and to one single time slot. Thus the synchronization discriminator operates as has been explained with reference to FIG. 5 and signals the end of the synchronization alarm with the signal SA=0 at the time 10.

Thus if synchronizing words occur which are to be assigned to a plurality of time slots and a plurality of channels, the t.d.m. frame is achieved by the following steps:

1. The recognition of two consecutive synchronizing words, both of which are to be assigned to the same time slot and the same channel, defines the beginning of the test period P. At this time the synchronization discriminator is unable to recognize whether the synchronizing words are the correct synchronizing words or simulated synchronizing words.

2. For the duration of the test period it is constantly checked whether synchronizing words are occurring which must be assigned to different time slots and different channels. If this is not so, the synchronization alarm is terminated at the end of the test period P. If, however, this is the case, the synchronization alarm continues.

3. After a given length of time during which the synchronization alarm has been given, in place of the data bits which have been input at the transmitting end via the data sources DQl to DQn, signals are transmitted which cannot simulate synchronizing words. For example, signals having continuous start polarity or continuous stop polarity can be transmitted. The given length of time is contrived to be such that the signals which cannot simulate synchronizing words are not transmitted until the end of the synchronization process, which has been described with reference to FIG. 5, as deduced from experience.

4. During the transmission of the signals which cannot simulate synchronizing words, the frame synchronization is carried out with the aid of the synchronization discriminator illustrated in FIG. 3. At the end of the synchronization alarm, the data signals Dl to Dn are again emitted from the data sources DQl to DQn in accordance with FIG. 1. If one of these data sources continues to input synchronizing words, this does not prove disturbing since the test period has expired and the gate U7 is blocked.

Although various minor modifications may be suggested by those versed in the art, it should be understood that we wish to embody within the scope of the patent warranted hereon, all such embodiments as reasonably and properly come within and scope of our contribution to the art.

We claim as our invention:

1. A method for the frame synchronization of a time division multiplex system with a multiplexer, which per time division multiplex frame has m time slots and which releases a time division multiplex signal which for each time division multiplex frame has $m-1$ data bits and one synchronizing bit, at least $p \geq 6$ synchronizing bits which directly follow one another from corresponding consecutive time frames to form a synchronizing word, wherein for attainment of a synchronous state a synchronization alarm signal is released, and wherein a synchronizing signal is provided for said frame synchronization, comprising the steps of:

(a) when in a non-synchronous state, and as so indicated by the synchronization alarm signal, beginning a test period after two consecutive synchronizing words are recognized and when the synchronizing signal is in phase with the two synchronizing words;

(b) ending the test period and having the alarm signal indicate and synchronous state if the synchronizing signal is in phase with a number of subsequent groups of P time division multiplex frames synchronizing words continuously received;

(c) ending the test period and having the alarm signal indicate the non-synchronous state if the synchronizing signal is in phase with the synchronizing words but a synchronizing word is not recognized; and (d) ending the test period and having the alarm signal indicate the non-synchronous state if the synchronizing signal is not phased in with the synchronizing words even though two synchronizing words are recognized but whose respective synchronizing bits lie in different time slots of the respective time division multiplex frames.

2. A method according to claim 1 including the further steps of:

(a) after a given duration of the synchronization alarm signal indicating the non-synchronous state, instead of the data bits of transmitting-side data sources binary signals of predetermined binary values are transmitted which differ from the synchronizing word; and (b) after successful frame synchronization, again the data bits of the transmitting-side data sources are transmitted.

* * * * *